US006850810B1

(12) United States Patent
Wang et al.

(10) Patent No.: US 6,850,810 B1
(45) Date of Patent: *Feb. 1, 2005

(54) METHOD AND SYSTEM FOR DESIGNING A PROFILE EXTRUSION CAPPING DIE

(75) Inventors: Hsin-Pang Wang, Rexford, NY (US); Erin Marie Perry, Niskayuna, NY (US); Martin Kin-Fei Lee, Niskayuna, NY (US)

(73) Assignee: General Electric Company, Schenectady, NY (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/465,306

(22) Filed: Dec. 17, 1999

(51) Int. Cl.⁷ .............................................. G06F 19/00

(52) U.S. Cl. ........................................ 700/97; 700/197

(58) Field of Search ........................... 700/97, 197, 196

(56) References Cited

U.S. PATENT DOCUMENTS

| | | | | | |
|---|---|---|---|---|---|
| 4,534,003 A | * | 8/1985 | Manzione | .................... | 700/200 |
| 5,377,119 A | * | 12/1994 | Backer et al. | ............... | 700/146 |
| 5,608,637 A | * | 3/1997 | Wang et al. | .................... | 700/97 |
| 5,835,379 A | * | 11/1998 | Nakano | ....................... | 700/197 |
| 5,926,393 A | | 7/1999 | Wang et al. | ................. | 700/197 |
| 5,989,780 A | * | 11/1999 | Strong | ......................... | 430/300 |
| 6,161,057 A | * | 12/2000 | Nakano | ....................... | 700/197 |

FOREIGN PATENT DOCUMENTS

EP          835735 A1    10/1997

OTHER PUBLICATIONS

"Coating Weight Uniformity and Die Internal Design" by John Chong, Journal of Imaging Science and Technology, vol. 41, No. 1, Jan.–Feb. 1997, pp. 41–47.
"A New Design Procedure for Profile Extrusion Dies" by P. Hurez and P.A. Tanguy, Polymer Engineering and Science, Mid–March 1996, vol. 36, No. 5, pps. 626–634.
"Computer Aided Design of Wire Coating Dies", by P.G. Lafleur and P. Arpin and V. Lenir—Advances in Polymer Technology, vol. 13, No. 4, 297–304 (1994).
"A Design Procedure for Profile Exctrusion Dies", P. Hurez and A. Tanguy, Polymer Engineering and Science, Mid––Mar. 1996, vol. 36, No. 5, pps. 626–635.

* cited by examiner

Primary Examiner—Leo Picard
Assistant Examiner—Chad Rapp
(74) Attorney, Agent, or Firm—Andrew J. Caruso; Philip D. Freedman (57) ABSTRACT

A method for enabling design of a profile extrusion capping die includes, obtaining a size and configuration of a land formable by the capping die, obtaining material properties of a capping resin, obtaining operating conditions for processing the capping resin, and determining, from the size and configuration of the land, the material properties, the operating conditions, at least one of a velocity distribution and a pressure distribution of the capping resin adjacent to an outlet of the land. Desirably, the method also includes obtaining a size and configuration of a runner formable by the profile extrusion capping die, and determining at least one of the velocity distribution and the pressure distribution of the capping resin in the land and the runner. Advantageously, the method is implemented on a system or computer using a finite element mesh of the land and the runner and graphically displaying the velocity distribution and the pressure distribution. The system allows a designer to design a profile extrusion capping die electronically by revising the size and configuration of the land, runner, and/or inlet gate, to obtain a uniform velocity of the capping resin along the land outlet thus resulting in a capping having a uniform thickness.

35 Claims, 5 Drawing Sheets

METHOD AND SYSTEM FOR DESIGNING A PROFILE EXTRUSION CAPPING DIE

BACKGROUND OF THE INVENTION

This invention relates generally to extrusion dies, and more particularly, to methods and systems for designing profile extrusion capping dies.

Profile extrusions are made by heating, for example, a thermoplastic resin in the barrel of an extruder and forcing it through a profile extrusion die that shapes it into a continuous two-dimensional shaped part. Typically, such parts are made from a single thermoplastic. However, where one or more surfaces of a part require greater strength, or greater durability such as weatherability or protection from ultraviolet light degradation, or a different color, etc., a second different plastic resin is often applied onto the one or more surfaces of the part using a capping die.

Typically, a capping die is disposed on the downstream side of a profile die during the extrusion process. The capping resin is fed in through a runner or manifold and a land formed by the capping die to apply a thin layer or capping to the desired surface of the part as it exits the extruder. Desirably, the capping die is sized and configured to provide a uniform velocity to the capping resin at an outlet of the land formed by the capping die so that a capping having a uniform thickness is applied to the part.

A capping die often has complicated cavity geometries to achieve a uniform capping thickness. The design and fabrication of a capping die requires many cutting trials and iterations. For example, an initial capping die is designed and fabricated, and then tested on a production line extruder to determine if the capping die produces the desired uniform capping. If the capping is not uniform, then the die must be re-cut.

This iterative process requires skilled designers and machinists and is labor and time intensive. In addition, modification to the capping die, is required if the dimensions of the profile die are changed or if a new plastic capping resin having different material properties is used in the extrusion process.

SUMMARY OF THE INVENTION

Accordingly, there is a need for a design technique that enables design of profile extrusion capping dies, for example, capping dies for various sizes and configurations, various processing conditions, and/or various types of capping resins. The present invention, which in one aspect is directed to a method for enabling design of a profile extrusion capping die which includes, obtaining a size and configuration of a land formable by the capping die, obtaining material properties of a capping resin, obtaining operating conditions for processing the capping resin, and determining, from the size and configuration of the land, the material properties, the operating conditions, at least one of a velocity distribution and a pressure distribution of the capping resin adjacent to an outlet of the land.

In another embodiment, a computer-implemented method for enabling design of a profile extrusion capping die includes, obtaining a size and configuration a land formable by the capping die, obtaining material properties of a capping resin, obtaining operating conditions for processing the capping resin, and determining, from the size and configuration of the land, the material properties, the operating conditions, at least one of a velocity distribution and a pressure distribution of the capping resin adjacent to an outlet of the land.

The method and computer-implemented method desirably include revising the size and configuration of the land, and determining from the revised size and configuration of the land, material properties, and the operating conditions, at least one of a revised velocity distribution and revised pressure distribution of the capping resin adjacent to the outlet of the land. Advantageously, the methods further include obtaining a size and configuration of a runner formable by the capping die, and determining at least one of the velocity distribution and the pressure distribution of the capping resin in the land and the runner.

In another embodiment, a system for enabling design of a profile extrusion capping die includes, a processor adapted to obtain a size and configuration of a land formable by the capping die, material properties of a capping resin, operating conditions for processing the capping resin, and determine, from the size and configuration of the land, the material properties, the operating conditions, at least one of a velocity distribution and a pressure distribution of the capping resin adjacent to an outlet of the land.

The system typically includes the processor adapted to obtain a revised size and configuration of the land, and determine from the revised size and configuration of the land, material properties, and the operating conditions, at least one of a revised velocity distribution and revised pressure distribution of the capping resin adjacent to the outlet of the land. Advantageously, the processor is adapted to obtain a size and configuration of a runner formable by the capping die, and determine at least one of the velocity distribution and the pressure distribution of the capping resin of the land and the runner.

DETAILED DESCRIPTION OF THE INVENTION

Figure 1:
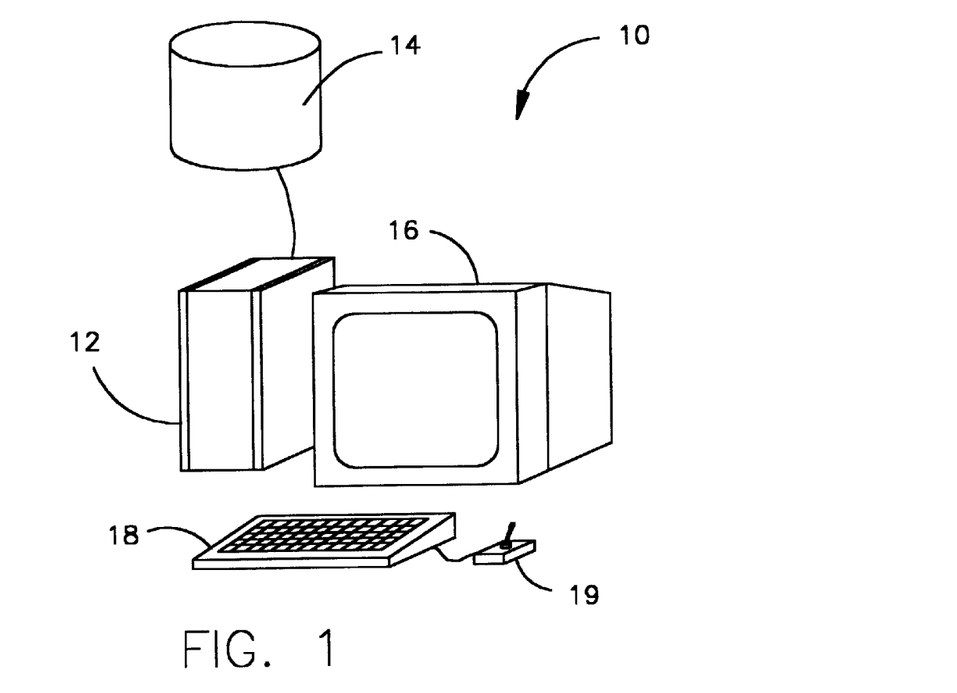
FIG. 1 is a diagram illustrating a system of the present invention for designing a profile extrusion capping die.

FIG. 1 illustrates one embodiment of a computing environment or system 10 incorporating and using the design techniques and capabilities of the present invention for enabling a designer to design a profile extrusion capping die for extruding a capping having a uniform thickness onto a surface of a part. System 10 includes, for instance, at least one computing unit or processor 12, memory such as data storage unit 14, and one or more input/output devices such as a printer or a display 16, a keyboard 18, and a mouse 19.

For example, system 10 may be a Digital VAX/VMS computer or a personal computer executing Microsoft WINDOWS, which runs on the INTEL PC architecture. The above-described system is only offered as an example. The present invention can be incorporated and used with many types of computing units, computers, processors, nodes, systems, work stations or environments without departing from the spirit of the present invention.

Figure 2:
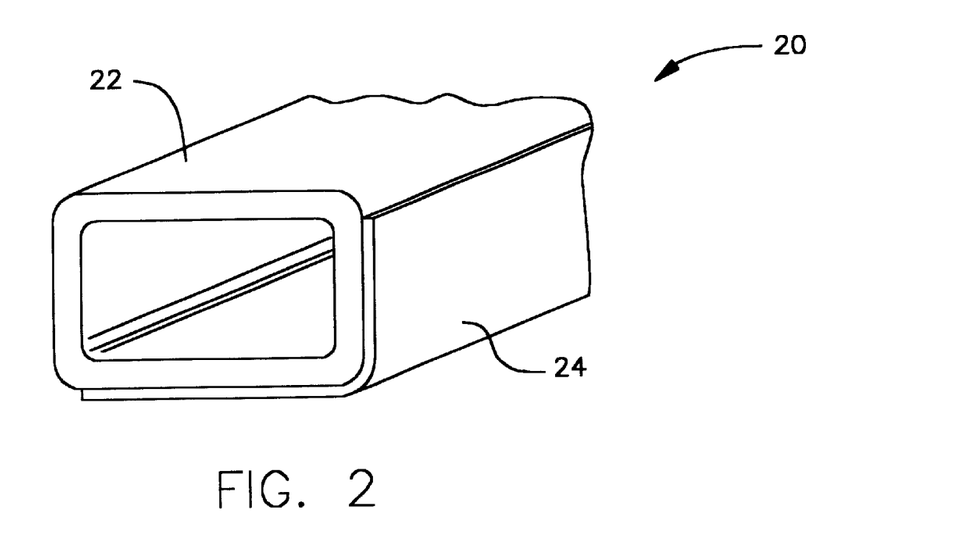
FIG. 2 is a perspective view of an exemplary part having a capping formed by a capping die (FIG. 3) designed using the system shown in FIG. 1.
Figure 3:
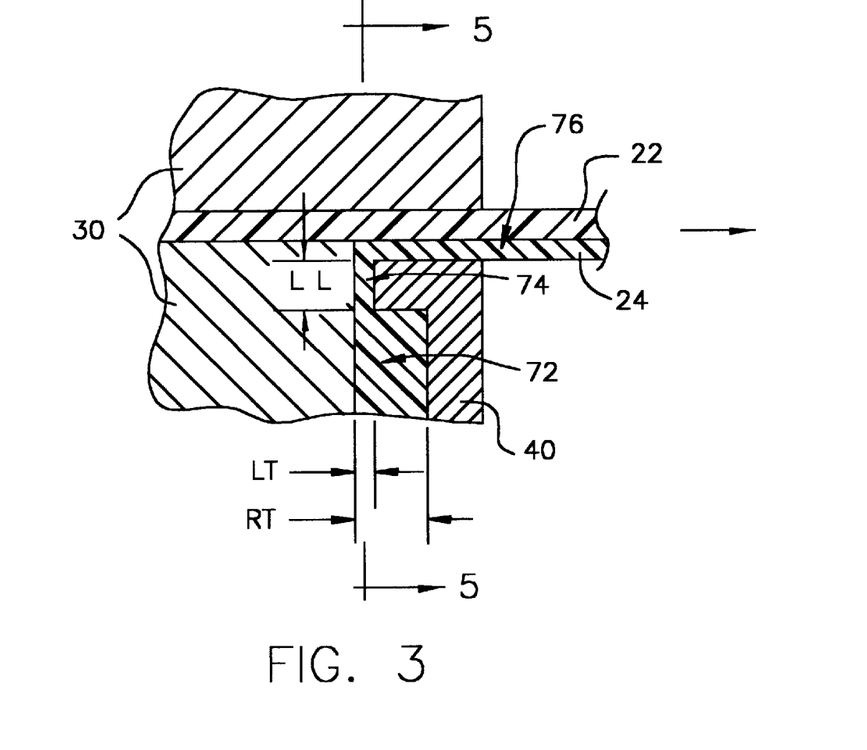
FIG. 3 is a partial, cross-sectional view of a profile die, and a capping die designed using the system shown in FIG. 1.

FIG. 2 illustrates an exemplary part 20 formed, as illustrated in FIG. 3, by a profile extrusion die 30 and an exemplary profile extrusion capping die 40 designed using the system shown in FIG. 1. From the description below, computer readable program code means for use in system 10 (FIG. 1) and for implementing the capping design techniques of the present invention may be readily programmed by those skilled in the art.

Part 20 includes a hollow, rectangular-shaped cross-sectional tube 22 and a capping 24 disposed on two sides of tube 22. Tube 22 is formed, as shown in FIG. 3, by extruding a profile resin from profile die 30 (FIG. 3) and capping 24 is formed by extruding a capping resin between capping die 40 (FIG. 3) and part 22.

Figure 4:
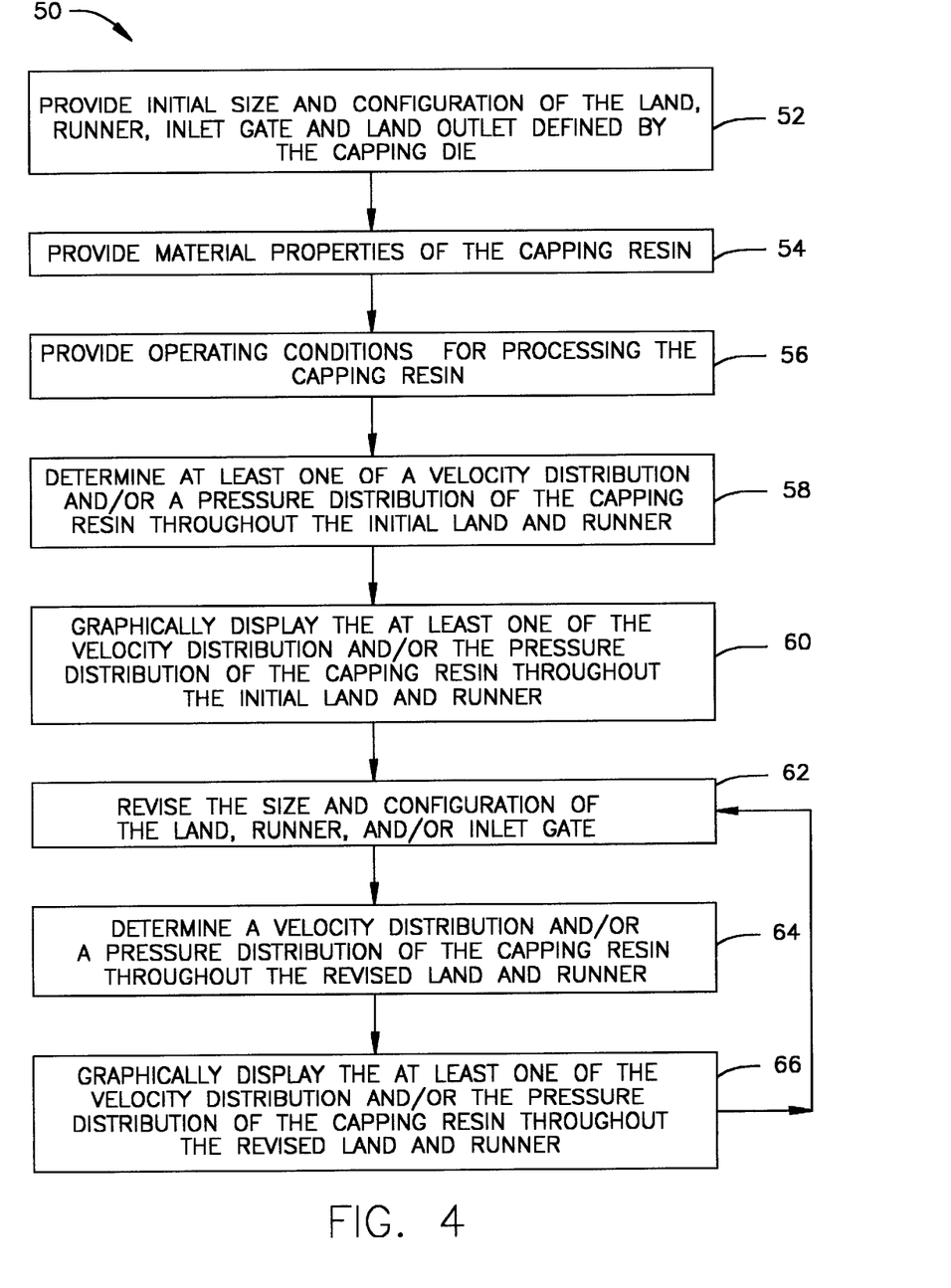
FIG. 4 is a flowchart illustrating a process of the present invention for designing the capping die of FIG. 3.

FIG. 4 illustrates an exemplary method 50 of the present invention for use in system 10 (FIG. 1) for enabling the design of capping die 40 for providing a capping having a uniform thickness. At 52, an initial or proposed size and configuration through which the capping resin flow are provided, e.g., inputted into system 10 (FIG. 1).

Figure 5:
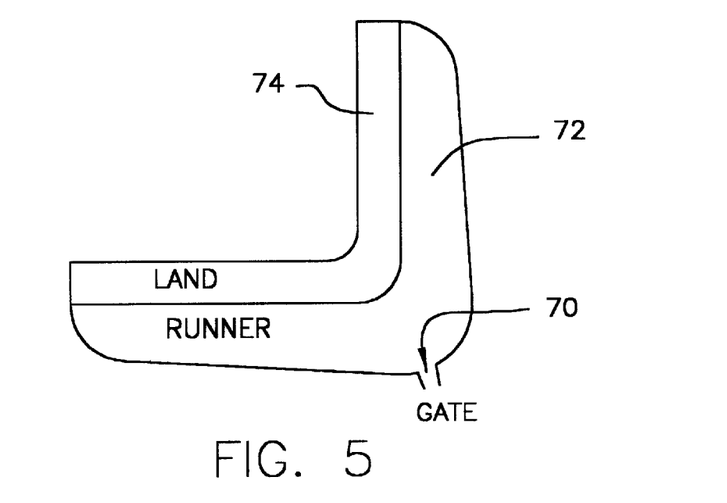
FIG. 5 is a cross-sectional view taken along line 5—5 in FIG. 3 illustrating the configuration of the land and the runner formed by the capping die of FIG. 3.

For example, with reference to FIGS. 3 and 5, capping die 40 (FIG. 3) defines an inlet gate 70 (FIG. 5) through which the capping resin is injected. Capping die 40 also defines a manifold or runner 72, e.g., a relatively thick cavity to provide a reservoir where the capping resin is held and through which the capping resin can easily flow, and a land 74, e.g., a relatively thin cavity where the resin flow is carefully controlled for discharge along an exit opening or outlet 76 (FIG. 3) between part 22 (FIG. 30) and capping die 40 (FIG. 3). In general, the runner is tapered in length so that the flow length towards the land is longer near the gate and shorter near the ends in order to force the resin to the furthest parts of the cavity before it enters the land. Initially, as a first design, the land length is generally constant.

With reference again to FIG. 4, at 54, the material properties of the capping resin are provided, or obtained, and at 56, the operating conditions for processing the capping resin, are provided or obtained. For example, the material properties of the capping resin and the operating condition for processing the capping resin may be stored and retrieved from data storage unit 14 upon a designer or engineer inputting the type of capping resin and the type of extruder to be used in forming the capping. Material properties of the capping resin include, for example, density, specific heat, thermal conductivity, and viscosity, fluid and thermal behavior of the capping resin (e.g., Newtonian vs. non-Newtonian flow, and isothermal vs. non-isothermal). Process conditions include, for example, pressure boundary conditions on the inlet gate and outlet of the land, temperature of the capping resin, fill time or inlet flow rate of the capping resin, fraction of the resin which enters the cavity at each of one or more inlet gates.

Figure 6:
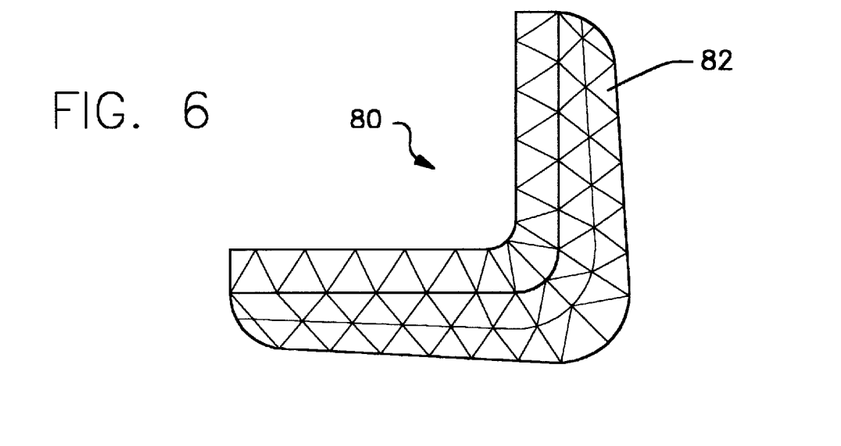
FIG. 6 is a diagram illustrating a finite element mesh of the land and the runner shown in FIG. 5.

At 58, the velocity distribution of the capping resin adjacent outlet 76 (FIG. 3) and desirably in land 74 (FIG. 3) and runner 72 (FIG. 3) are determined. Determining the velocity distribution (e.g., velocity of the capping resin occurring at various points or portions) includes generating a finite element mesh of land 74 (FIG. 3) and runner 72 (FIG. 3). For example, the geometry of land 74 and runner 72 formed by capping die 40 is broken into discrete triangular-shaped elements, interconnected at discrete node points as shown in FIG. 6. A standard finite element mesh generation program, such as I-DEAS provided by Structural Dynamics Research Corporation of Milford, Ohio or Patran provided by The MacNeal-Schwendler Corporation of Los Angeles, Calif., can be used to create the finite element geometry.

The average velocity through the die thickness, for example, is determined using the one-dimensional flow balance equation between two flat plates, as follows:

$$V_{die} = \frac{nt_{die}}{2(2n+1)} \left( \frac{t_{die} \Delta P}{2L_{die} K} \right)^{1/n} \quad (1)$$

wherein $t_{die}$ is the die thickness, $\Delta P$ is the pressure drop across the die plate, $L_{die}$ is the die land length, n is the power index of the resin (which can range from 0.2 to 1.0, depending on the resin (1.0 being for Newtonian behavior)), and K is the consistency index of the resin which is function of temperature and shear rate.

Figure 7:
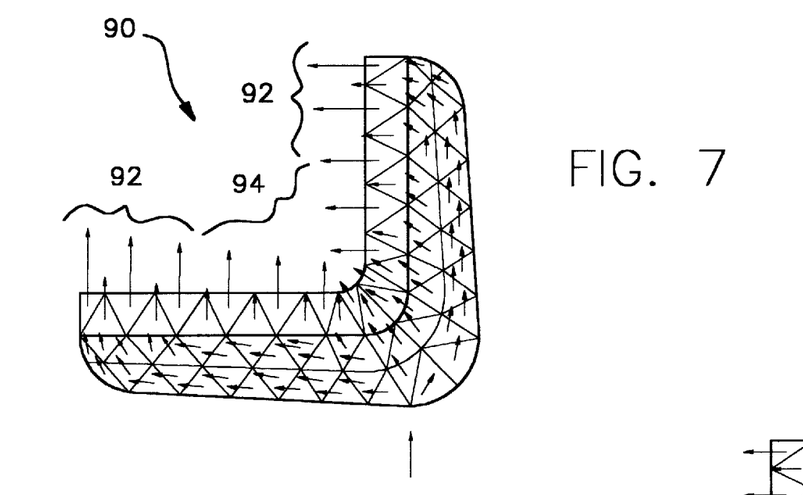
FIGS. 7 and 8 are diagrams, similar to FIG. 6, illustrating the velocity distributions of a capping resin in an initial and a revised configuration of the land and the runner.

FIG. 7 illustrates an exemplary display 90 of a determination of the velocity distribution for an initially proposed land runner, the material properties of a capping resin, and the operating conditions. For example, a velocity is calculated for each of the elements of the finite mesh. A velocity vector, e.g., an arrow, is used for each triangular-shaped element, whereas the size of the arrow indicates the relative magnitude of the velocity of the capping resin flow and the orientation of the arrow indicates the direction of the capping resin flow.

As shown in FIG. 7, the velocity distribution of the capping resin predicted at different locations along the exit opening formed by the capping die is not constant, i.e., the velocity vectors have different lengths representing different velocity magnitudes. For example, the velocity of the capping resin at the exit opening at an end portion 92 of the capping die is greater than that at the exit opening at a corner portion 94 of the capping die.

With reference again to FIG. 3, the velocity of the capping resin can be increased or decreased at different locations around the profile by adjusting a land length LL, a land thickness LT and/or a taper of land 74, a runner length (not shown in FIG. 3), a runner thickness RT or a taper of runner or the location and size of inlet gate 70. Also, as observed in Equation (1), the land length is a less sensitive parameter than the land thickness. Since the land length is typically at least an order of magnitude larger than the thickness, it is substantially easier to make adjustments in the magnitude of the land length than in the land thickness.

Figure 8:
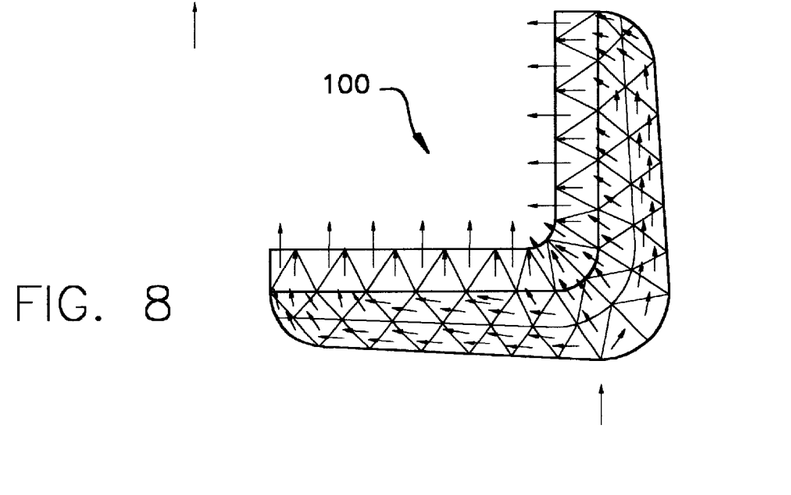

Desirably, after one or more iterations adjusting the land length (i.e., the distance between the runner/land intersection and exit opening of the land), the velocity distribution of the capping resin along the land outlet can be made to be uniform as shown in FIG. 8. From the present invention, it will be appreciated by those skilled in the art that the velocity of the capping resin need not be the same as the velocity of the profile in order to form a uniform capping thickness.

The technique allows a designer to electronically implement many design iterations using a computer rather than constructing and testing a physical version of the capping die. For parts made with a co-injection process, in which one resin forms the extruded profile while another forms the capping, the capping die design can be coupled with the profile die design. The technique can be easily applied to different profile geometries or different capping resins.

With reference again to FIG. 2, for tube 22 formed from a thermoplastic resin such as Cycolac (a General Electric plastic resin) having a cross-section 1.5 inch by 1.25 inch, wall thickness of about 0.060 inch, and capping 24 formed from a thermoplastic resin such as Geloy (a General Electric plastic resin) having a thickness of about 0.005 inch to about 0.015 inch thick, capping die 40 defines a land having a length of about 0.25 inch, a thickness of about 0.013 inch, and runner having a thickness of about 0.25 inch. The land exit outlet is typically similar to the land thickness. The land length, i.e., the distance from the runner to the profile surface, is often on the order of about 10 to about 50 times the land thickness. In the design of such a capping die 40, the adjustment to the land lengths would be on the order of 0.04 inch. It is also observed that the velocity vectors in the runner are all directed away from the inlet gate, as the material flows to fill this reservoir, while the vectors in the land are all directed towards the exit edge. Advantageously, the inlet gate is not located at the center of the arc in the runner, but is instead biased to one side, to account for the longer edge length on that side of the rectangular profile section.

In Equation (1), the velocity is related to the pressure at the exit opening, and thus, a pressure distribution of the capping resin can be suitably determined and illustrated in the land and the runner. From the present description, it will be appreciated by those skilled in the art that the display of the velocity or pressure distribution may be based on color, e.g., where higher velocity or pressure is represented in one color, e.g., in red, and lower velocity or pressure is represented in blue. Accordingly, multiple colors will represent nonuniform velocity or pressure in the land or the runner. Advantageously, the magnitude and orientation of the arrows can represent the velocity distribution while the color of the arrow can be used to represent the pressure distribution of the capping resin.

Compared to capping the outside corner surface of a part or so called "convex" surface of a part such as that illustrated in FIG. 2, inner corners or so called "concave" surfaces, are more difficult to cap.

Figure 9:
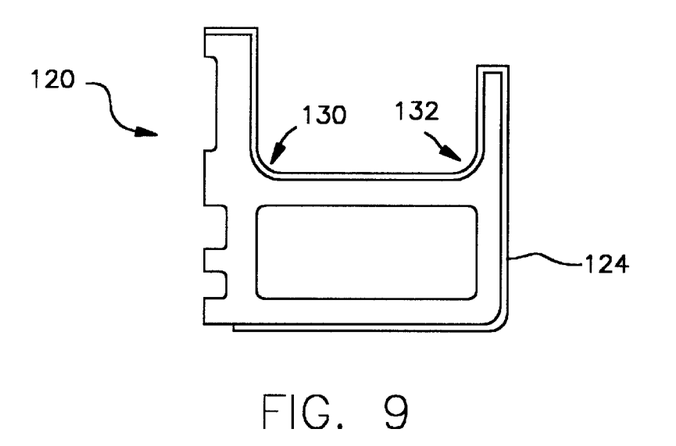
FIG. 9 is a cross-sectional view of an alternative part having a capping.

FIG. 9 illustrates an exemplary part 120 exhibiting both convex and concave surfaces to be coated with a capping 124. In this more complicated geometry, it is difficult to provide the capping resin in corners 130 and 132 of capping 124 because the flow distance is shorter perpendicular to the surface than it is to the corner location itself. In this case, adjustment of the land length or the runner taper often fails to provide a uniform velocity or pressure of the capping resin at the exit opening of the capping die. In this case, the land thickness needs to be adjusted.

Figure 10:
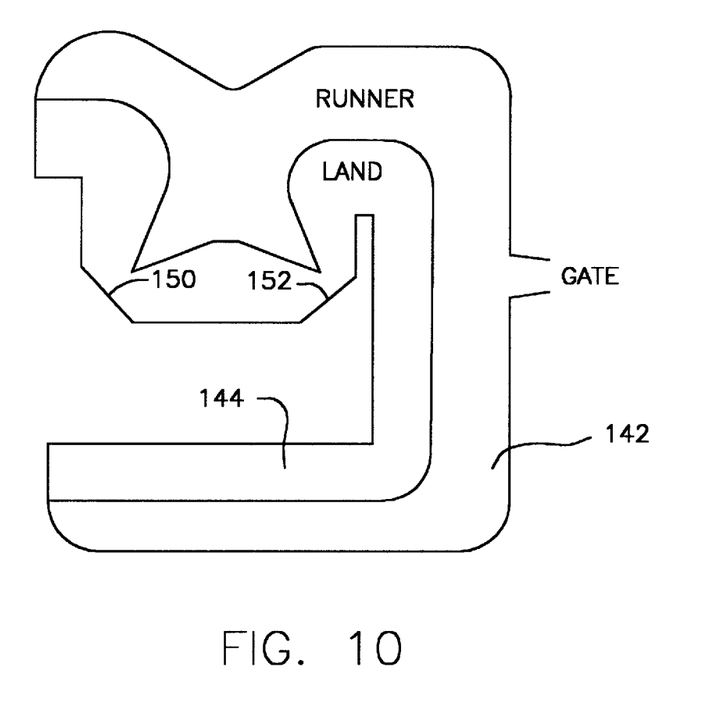
FIG. 10 is a view, similar to FIG. 5, illustrating the configuration of the land and runner designed using the system shown in FIG. 1 for forming the capping shown in FIG. 9.

FIG. 10 illustrates the configuration of a land 144 and a runner 142 defined by a capping die for applying capping 124 (FIG. 9). For example, to obtain uniform flow of the capping resin, the land length nearest to the concave surfaces is reduced so that more resin reaches the inner corner. This is done by designing "pointy" runner regions near the concave corners. Increasing the land thickness adjacent to the corners, illustrated by the clipped or chamfered corners 150 and 152, also increases the amount of flow to the inner corners. Since capping dies for cappings having concave surfaces are more difficult to design, ten to twenty iterations may be required by a designer to achieve a uniform velocity of the capping resin for providing a capping having a uniform thickness on the surface of the part.

In addition, the present invention can be included in an article of manufacture (e.g., one or more computer program products) having, for instance, computer usable media. The media has embodied therein, for instance, computer readable program code means for providing and facilitating the capabilities of the present invention. The article of manufacture can be included as a part of a computer system or sold separately.

Additionally, at least one program storage device readable by a machine, tangibly embodying at least one program of instructions executable by the machine to perform the capabilities of the present invention can be provided.

The flowchart or flow diagram depicted herein is just exemplary. There may be many variations to this diagram or the steps (or operations) described therein without departing from the spirit of the invention. For instance, the steps may be performed in a differing order, or steps may be added, deleted or modified. All of these variations are considered a part of the claimed invention.

Although preferred embodiments have been depicted and described in detail herein, it will be apparent to those skilled in the relevant art that various modifications, additions, substitutions and the like can be made without departing from the spirit of the invention and these are therefore considered to be within the scope of the invention as defined in the following claims.

What is claimed is:

1. A method for designing a profile extrusion capping die, the method comprising:
   obtaining a size and configuration of a land of the capping die; wherein said size and configuration of said land comprises a thickness and a length of the land;
   obtaining at least one material property of a capping resin;
   obtaining at least one operating condition for processing the capping resin; and
   determining at least one of a velocity distribution and a pressure distribution of the capping resin along the length of the land, from the thickness of the land, the length of the land, the material property of the resin and the operating condition.

2. The method of claim 1 wherein the determining comprises determining the velocity distribution of the capping resin adjacent to the outlet of the land.

3. The method of claim 1 wherein the determining comprises determining the pressure distribution of the capping resin adjacent to the outlet of the land.

4. The method of claim 1 wherein the determining comprises determining the velocity distribution and the pressure distribution of the capping resin adjacent to the outlet of the land.

5. The method of claim 1 further comprising graphically displaying the at least one of the velocity distribution and the pressure distribution of the capping resin adjacent to the outlet of the land.

6. The method of claim 1 further comprising obtaining a size and configuration of a runner of the capping die, and using said size and configuration of the runner to determine at least one of the velocity distribution and the pressure distribution of the capping resin in the land and the runner.

7. The method of claim 6 comprising using said size and configuration of the runner to determine a finite element mesh of the land and the runner.

8. The method of claim 6 further comprising graphically displaying the at least one of the velocity distribution and the pressure distribution of the capping resin in the land and the runner.

9. The method of claim 1 wherein the method is a computer-implemented method.

10. A system for designing a profile extrusion capping die, said system composing:
   a processor adapted to obtain a thickness and a length of a land of the capping die;
   said processor further adapted to obtain a material property of a capping resin;
   said processor further adapted to obtain an operating condition for processing the capping resin; and
   said processor further adapted to determine at least one of a velocity distribution and a pressure distribution of the capping resin adjacent to an outlet of said land from said thickness of said land, length of said land, said material property, and said operating condition.

11. The system of claim 10 further comprising said processor adapted to obtain a revised size and configuration of said land, and said processor adapted to determine from said revised size and configuration of said land, material properties, and said operating conditions, at least one of a revised velocity distribution and revised pressure distribution of the capping resin adjacent to said outlet of said land.

12. The system of claim 10 wherein said processor is adapted to determine said velocity distribution of the capping resin adjacent to said outlet of said land.

13. The system of claim 10 wherein said processor is adapted to determine said pressure distribution of the capping resin adjacent to said outlet of said land.

14. The system of claim 10 wherein said processor is adapted to determine said velocity distribution and said pressure distribution of the capping resin adjacent to said outlet of said land.

15. The system of claim 10 further comprising a display for graphically displaying said at least one of said velocity distribution and said pressure distribution of the capping resin adjacent to said outlet of said land.

16. The system of claim 10 further comprising said processor adapted to obtain a size and configuration of a runner formable by the capping die, and said processor adapted to determine at least one of said velocity distribution and said pressure distribution of the capping resin in said land and said runner.

17. The system of claim 16 wherein said processor adapted to generate a finite element mesh of said land and said runner.

18. The system of claim 16 further comprising a display for graphically displaying said at least one of said velocity distribution and said pressure distribution of the capping resin in said land and said runner.

19. A system for designing a profile extrusion capping die, said system comprising:
   means for obtaining a size and configuration of a land formable by the capping die; wherein said size and configuration of said land comprises a thickness and a length of the land
   means for obtaining material properties of a capping resin;
   means for obtaining operating conditions for processing the capping resin; and
   means for determining at least one of a velocity distribution and a pressure distribution of the capping resin adjacent to an outlet of said land from said size and configuration of said land, said material properties, and said operating conditions.

20. The system of claim 19 further comprising means for obtaining a revised size and configuration of said land, and means for determining from said revised size and configuration of said land, material properties, and said operating conditions, at least one of a revised velocity distribution and revised pressure distribution of the capping resin adjacent to said outlet of said land.

21. The system of claim 19 wherein said means for determining comprises means for determining said velocity distribution of the capping resin adjacent to said outlet of said land.

22. The system of claim 19 wherein said means for determining distribution of the capping resin comprises means for determining said pressure adjacent to said outlet of said land.

23. The system of claim 19 wherein said means for determining comprises means for determining said velocity distribution and said pressure distribution of the capping resin adjacent to said outlet of said land.

24. The system of claim 19 further comprising means for graphically displaying said at least one of said velocity distribution and said pressure distribution of the capping resin adjacent to said outlet of said land.

25. The system of claim 19 further comprising means for obtaining a size and configuration of a runner formable by the capping die, and means for determining at least one of said velocity distribution and said pressure distribution of the capping resin in said land and said runner.

26. The system of claim 25 wherein said means for determining at least one of said velocity distribution and said pressure distribution of the capping resin in said land and said runner comprises means for generating a finite element mesh of said land and said runner.

27. The system claim 25 further comprising means for graphically displaying said at least one of said velocity distribution and said pressure distribution of the capping resin of said land and said runner.

28. At least one program storage device readable by a machine, tangibly embodying at least one program of instructions executable by the machine to perform a method for designing a profile extrusion capping die, the method comprising:
   obtaining a size and configuration of a land formable by the capping die; wherein said size and configuration of said land comprises a thickness and a length of the land;
   obtaining material properties of a capping resin;
   obtaining operating conditions for processing the capping resin; and
   determining at least one of a velocity distribution and a pressure distribution of the capping resin adjacent to an outlet of the land from the size and configuration of the land, the material properties, and the operating conditions.

29. The at least one program storage device of claim 28 further comprising obtaining a revised size and configuration of the land, and determining from the revised size and configuration of the land, material properties, and the operating conditions, at least one of a revised velocity distribution and revised pressure distribution of the capping resin adjacent to the outlet of the land.

30. The at least one program storage device of claim 28 further comprising obtaining a size and configuration of a runner formable by the capping die, and wherein the determining comprises determining at least one of the velocity distribution and the pressure distribution of the capping resin in the land and the runner.

31. An article of manufacture comprising at least one code means embodied computer usable medium having computer readable program therein for designing a profile extrusion capping die, the computer readable program code means in said article of manufacture comprising:

computer readable program code means for obtaining a size and configuration of a land formable by the capping die; wherein said size and configuration of said land comprises a thickness and a length of the land;

computer readable program code means for obtaining material properties of a capping resin;

computer readable program code means for obtaining operating conditions for processing the capping resin; and computer readable program code means for determining at least one of a velocity distribution and a pressure distribution of the capping resin adjacent to an outlet of said land and from said size and configuration of said land, said material properties, and said operating conditions.

32. The article of manufacture of claim 31 further comprising computer readable program code means for obtaining a revised size and configuration of said land, and computer readable program code means for determining from said revised size and configuration of said land, material properties, and said operating conditions, at least one of a revised velocity distribution and revised pressure distribution of the capping resin adjacent to said outlet of said land.

33. The article of manufacture of claim 31 further comprising computer readable program code means for obtaining a size and configuration of a runner formable by the capping die, and computer readable program code means for determining at least one of said velocity distribution and said pressure distribution of the capping resin in said land and said runner.

34. The method of claim 1, further comprising revising at least one of the length of the land, the thickness of the land, the material property and the operating condition to obtain at least one of a uniform velocity distribution and a uniform pressure distribution along the length of the land.

35. A method for designing a profile extrusion capping die, comprising steps of:

(A) providing (i) a size and configuration of a land of the capping die;

(B) providing (ii) at least one material property of a capping resin;

(C) providing (iii) at least one operating condition for processing the capping resin in the die;

(D) conducting a profile extrusion capping process according to (i) the provided size and configuration of the capping die, (ii) the material property of the capping resin and (iii) the operating condition to determine at least one of a velocity distribution and a pressure distribution of the capping resin along the length of the land;

(E) revising at least one of (i) the provided size and configuration of the capping die, (ii) the material property of the capping resin and (iii) the operating condition and conducting a profile extrusion capping process according to at least one of a revised size and configuration of the capping die, a revised material property of the capping resin and a revised operating condition; and (F) reiterating step (E) until the profile extrusion capping process provides a uniform capping resin velocity.

* * * * *